United States Patent
Chen et al.

(10) Patent No.: US 6,468,501 B1
(45) Date of Patent: Oct. 22, 2002

(54) METHOD FOR HETEROATOM LATTICE SUBSTITUTION IN LARGE AND EXTRA-LARGE PORE BOROSILICATE ZEOLITES

(75) Inventors: Cong-Yan Chen, Richmond; Stacey I. Zones, San Francisco, both of CA (US)

(73) Assignee: ChevronTexaco Corporation, San Ramon, CA (US)

( * ) Notice: Subject to any disclaimer, the term of this patent is extended or adjusted under 35 U.S.C. 154(b) by 0 days.

(21) Appl. No.: 09/662,119

(22) Filed: Sep. 14, 2000

(51) Int. Cl.$^7$ ................................................ C01B 39/06
(52) U.S. Cl. ...................... 423/713; 423/714; 423/715; 502/85; 502/61; 502/73; 502/74
(58) Field of Search ........................... 423/713, 714, 423/715; 502/61, 66, 73, 74, 85

(56) References Cited

U.S. PATENT DOCUMENTS

| | | | |
|---|---|---|---|
| 4,524,140 A | * | 6/1985 | Chang et al. |
| 4,963,337 A | * | 10/1990 | Zones |
| 5,061,466 A | * | 10/1991 | Chang et al. |
| 5,512,267 A | * | 4/1996 | Davis et al. ................. 423/705 |
| 5,653,956 A | * | 8/1997 | Zones ......................... 423/706 |
| 5,965,104 A | * | 10/1999 | Lee et al. .................... 423/706 |
| 6,080,382 A | * | 6/2000 | Lee et al. .................... 423/706 |
| 6,103,215 A | * | 8/2000 | Zones et al. ................. 423/702 |

* cited by examiner

Primary Examiner—David Sample
(74) Attorney, Agent, or Firm—Burns, Doane, Swecker & Mathis, L.L.P.

(57) ABSTRACT

The present invention provides a method for preparing a zeolite having lattice substituted heteroatoms. The method includes: (a) contacting a calcined borosilicate zeolite with an acid, thereby producing an at least partially deboronated zeolite; and (b) contacting the at least partially deboronated zeolite with a salt-containing aqueous solution comprising one or more salts selected from the group consisting of aluminum salt, gallium salt, and iron salt, thereby producing a silicate or borosilicate zeolite having a lattice comprising aluminum atoms; gallium atoms, iron atoms or a combination thereof. Step (b) is conducted at a pH of about 3.5 or less. Preferably, step (a), step (b) or both are conducted at a temperature of from about ambient temperature to about 300° C., preferably, under stirring/tumbling.

28 Claims, 1 Drawing Sheet

METHOD FOR HETEROATOM LATTICE SUBSTITUTION IN LARGE AND EXTRA-LARGE PORE BOROSILICATE ZEOLITES

BACKGROUND OF THE INVENTION

1. Field of the Invention

This invention relates to a new method for improving lattice substitution of heteroatoms in large and extra-large pore borosilicate zeolites.

2. Description of the Related Art

Natural and synthetic microporous crystalline molecular sieves including metallosilicates have found widespread industrial applications as catalysts, adsorbents and ion exchangers. These molecular sieves have distinct crystal structures with ordered pore structures which are demonstrated by distinct X-ray diffraction patterns. The crystal structure defines cavities and pores which are characteristic of the different types of zeolite and are similar in size to small organic molecules (generally 3–15 Å). The adsorptive, catalytic and/or ion exchange properties of each molecular sieve depend largely on its large internal surface area and highly distributed active sites, both of which are accessible through uniform molecularly sized channels and cavities.

According to the Structure Commission of the International Zeolite Association, there are over 120 different microporous crystalline molecular sieve structures. The cage or pore size of these materials is denoted by the number of oxygen atoms (likewise the number of tetrahedral atoms) circumscribing the pore or cavity, e.g., a pore circumscribed by n oxygen-atoms is referred to as an n membered-ring pore, or more simply, n-MR. Molecular sieves containing pores and/or cages with molecular-sized windows (containing 8-MR or larger) can have industrial utility in separation, ion exchange and catalysis. Depending on the largest pore openings that they possess, molecular sieves are usually categorized into small (8-MR), medium (10-MR), large (12-MR) and extra-large ($\geq$14-MR) pore molecular sieves.

Metallosilicates are molecular sieves with a silicate lattice wherein a metal atom (referred to herein as "heteroelement" or "heteroatom") can be substituted into the tetrahedral positions of the silicate framework. Examples of these metals are boron, aluminum, gallium, iron and mixtures thereof. The substitution of boron, aluminum, gallium and iron for silicon results in a change in the balance between the silicon and the corresponding trivalent ions in the framework, thereby resulting in a change of the electrical charge on the framework of the molecular sieve. In turn, such a change in the framework charge alters the ion exchange capacity of a material as well as the adsorptive and catalytic behavior because of the distinct physicochemical properties of these heteroelements. Thus, the utility of a particular molecular sieve, and in particular its adsorptive, catalytic and ion exchange properties, depend largely not only on its crystal structure but also on the properties related to the framework composition. For example, stronger acid strength in zeolite catalysts is required for iso-butane/butene alkylation at lower reaction temperatures to simultaneously achieve higher activity and a lower deactivation rate of the catalyst. By contrast, as demonstrated by S. Namba et al. (Zeolites 11, 1991, p.59) in studies on the alkylation of ethylbenzene with ethanol over a series of metallosilicates with MFI (ZSM-5) zeolite structure, namely, B-ZSM-5, Sb-ZSM-5, Al-ZSM-5, Ga-ZSM-5 and Fe-ZSM-5, the para-selectivity to para-diethylbenzene is largely related to the acid strength of the catalysts and the weaker acid sites provide a higher para-selectivity.

In nature, molecular sieves commonly form as geothermally heated ground water passes through silicate volcanic ash. Early attempts to synthesize zeolites centered around recreating the high-pressure, high-temperature conditions found in nature. Barrer (J. Chem. Soc., 1948, p. 127) demonstrated the first successful zeolite synthesis (mordenite) while Milton (U.S. Pat. No. 2,882,243 (1959)) developed the large-scale zeolite synthesis at low temperatures and pressures that allowed zeolites to gain industrial importance. These zeolite syntheses relied on the presence of alkali metal cations in the synthesis mixture to serve as a mineralizing agent. The alkali metal cations also play a role in the structure direction of the particular zeolite that forms. Building on the concept of cationic structure direction, the range of cations was subsequently expanded later on from the inorganic metal cations to organic cations such as quaternized amines.

Theoretical studies of molecular sieve structures and structure types indicate that only a small fraction of the configurations possible for microporous, crystalline molecular sieves have been discovered. Apparently, the major roadblock in tailoring and utilizing molecular sieve materials for specific applications in catalysis, adsorption and ion exchange is the development of synthesis methods to produce the desirable structure with the desirable framework composition.

In principle, there are two routes leading to the formation of a particular molecular sieve structure with a particular framework composition, e.g., a particular metallosilicate such as aluminosilicate, gallosilicate, ferrosilicate or borosilicate of the same crystal structure: (1) direct synthesis and (2) post-synthetic treatment (secondary synthesis).

Direct synthesis is the primary route for the synthesis of molecular sieves. The major variables that have a predominant influence on the molecular sieve structure include: synthesis mixture composition, temperature and the period of time for which the synthesis is allowed to proceed. Even though each variable contributes to a specific aspect of the nucleation and crystallization during synthesis of a molecular sieve, there is substantial interplay between these elements during the formation of molecular sieves. In the presence of heteroelement X (X=Al, Ga, Fe or B, for example, or X=none for pure-silica molecular sieves), the Si/X ratio will determine the elemental framework composition of the crystalline product; but the amount of the heteroelement in the synthesis mixture also can determine which structure, if any, crystallizes. In addition to the Si/X ratio, various other factors related to the gross composition of the synthesis mixture also play an important role. These factors include: OH$^-$ (or F$^-$) concentration, cations (both organic and inorganic), the presence of anions other than OH$^-$ (or F$^-$), and the amount of water in the synthesis mixture. There are also history-dependent factors such as digestion or aging period, stirring, nature (either physical or chemical) of the synthesis mixture, and order of mixing.

In short, depending on the nature of the molecular sieves and the chemistry of their formation, some of these molecular sieve structures can be synthesized using a broad spectrum of framework compositions; such as ZSM-5 containing heteroatoms, i.e., (Si-ZSM-5 or silicalite-1), Al(Al-ZSM-5), B(B-ZSM-5), Fe(Fe-ZSM-5 and Ga(Ga-ZSM-5), whereas the synthesis of other structures succeeds only if certain heteroatoms are present in the synthesis mixture and, in turn, incorporated into the framework. Or, some structures containing specific heteroatom(s) can be synthesized only in a limited range of Si/X ratio. Some structures containing specific heteroatom(s) can be synthesized only if certain specific, usually more expensive, structure-directing agents are employed. These complicated relationships between zeolite structures, framework compositions and structure directing agents have been discussed in many publications and patents, e.g., by Zones et al. in *J. Am. Chem. Soc.*, 122, 2000, p. 263.

U.S. Pat. No. 4,963,337 ("the '337 patent") to Zones discloses a procedure for synthesizing borosilicate zeolite SSZ-33 (which is the first synthetic zeolite containing intersected 10- and 12-membered ring channels) by using N,N,N-trimethyl-8-tricyclo[5.2. $1.0^{2,6}$]decane ammonium cation as a structure-directing agent. Attempts for direct synthesis of aluminosilicate, gallosilicate and ferrosilicate SSZ-33 using this structure-directing agent have not been successful.

U.S. Pat. No. 4,910,006 to Zones et al. discloses a procedure for synthesizing aluminosilicate zeolite SSZ-26 (which has a very similar crystalline structure to SSZ-33) using N,N,N,N',N',N'-hexamethyl[4.3.3.0]propellane-8,11-diammonium cation as a structure-directing agent. However, this structure-directing agent is difficult to make and, hence, much more expensive than N,N,N-trimethyl-8-tricyclo $[5.2.1.0^{2,6}]$ decane ammonium cation which is used for the synthesis of borosilicate SSZ-33.

In addition to the preparation of a specific molecular sieve structure with a specific framework composition via the aforesaid direct synthesis, post-synthetic treatments (or secondary synthesis) often provide a more economic alternative route to achieve this goal. The post-synthetic treatment techniques all operate on the same principle: the desirable heteroatoms such as Al, Ga and Fe are inserted into lattice sites previously occupied by other T-atoms such as B. For example, the '337 patent discloses a method of converting borosilicate SSZ-33 (referred to as B-SSZ-33) into aluminosilicate SSZ-33 (referred to as Al-SSZ-33) with much stronger framework acid sites, by heating a calcined B-SSZ-33 in an aqueous $Al(NO_3)_3$ solution at ~100° C. As shown in the '337 patent, Al-SSZ-33 provides a 62% feed conversion for the acid-catalyzed n-hexane/3-methylpentane cracking at 800° F. By contrast, due to the low acidity associated with boron-atoms in B-SSZ-33 framework this zeolite has essentially no activity for the same reaction under the same conditions. This illustrates the benefits of making catalytically more active aluminosilicate zeolites from their borosilicate counterparts via post-synthetic treatments.

In summary, to date, direct synthesis is often difficult or impossible for preparing some useful structures of catalytically active alumino-, gallo- or ferrosilicate zeolites. As shown in e.g., the '337 patent, it is possible to synthesize novel borosilicate zeolite structures. Borosilicate zeolites, however, are not sufficiently catalytically active to be practicable for certain hydrocarbon conversion processes.

Therefore, there remains a need for a method of replacing the boron in borosilicate zeolites with other heteroatoms that may enhance the catalytic activity of the zeolite.

SUMMARY OF THE INVENTION

In one embodiment (method A), the invention provides a method for preparing a zeolite having lattice substituted heteroatoms. The method comprises: (a) contacting a calcined large or extra-large pore borosilicate zeolite with an acid, thereby producing an at least partially deboronated zeolite; and (b) contacting the at least partially deboronated zeolite with a salt-containing aqueous solution comprising one or more salts selected from the group consisting of aluminum salt, gallium salt, and iron salt, thereby producing a silicate or borosilicate zeolite having a lattice comprising aluminum atoms; gallium atoms, iron atoms or a combination thereof. Step (b) is conducted at a pH of about 3.5 or less. Preferably, step (a), step (b) or both are conducted at a temperature of from about ambient temperature to about 300° C., optionally, under stirring.

In a second embodiment (method C), the invention provides a method of preparing a zeolite having substituted heteroatoms. The method of this second embodiment of the invention comprises contacting a calcined large or extra-large pore borosilicate zeolite with a solution selected from the group consisting of an aqueous aluminum salt solution, thereby producing an aluminosilicate zeolite; an aqueous gallium salt solution, thereby producing a gallosilicate zeolite; an aqueous iron salt solution, thereby producing a ferrosilicate zeolite and mixtures thereof; and wherein said contacting occurs at a pH of not greater than about 3.5. Preferably, the contacting is conducted at a temperature of from about ambient temperature to about 300° C., optionally under stirring (method B).

The method of the invention (in all its embodiments, including methods A, B, and C) is particularly efficient for heteroatom lattice substitution in zeolites having a pore size larger than approximately 6.5 Å.

The method of the invention is particularly suitable for producing lattice substituted zeolites comprising an aluminosilicate zeolite selected from the group consisting of SSZ-24, SSZ-31, SSZ-33, SSZ-41, SSZ-42, SSZ-43, SSZ-45, SSZ-47, SSZ-48, SSZ-55, CIT-1, CIT-5, UTD-1, and mixtures thereof, or a gallosilicate zeolite selected from the group consisting of SSZ-24, SSZ-31, SSZ-33, SSZ-41, SSZ-42, SSZ-43, SSZ-45, SSZ-47 SSZ-48, SSZ-55, CIT-1, CIT-5, UTD-1, and mixtures thereof, or a ferrosilicato zeolite selected from the group consisting of SSZ-24, SSZ-31, SSZ-33, SSZ-41, CCS-42, SSZ-43, SSZ-45, SSZ-47, SSZ-48, SSZ-55, CIT-1, CIT-5, UTD-1, and mixtures thereof.

DETAILED DESCRIPTION OF PREFERRED EMBODIMENTS OF THE INVENTION

Figure 1:
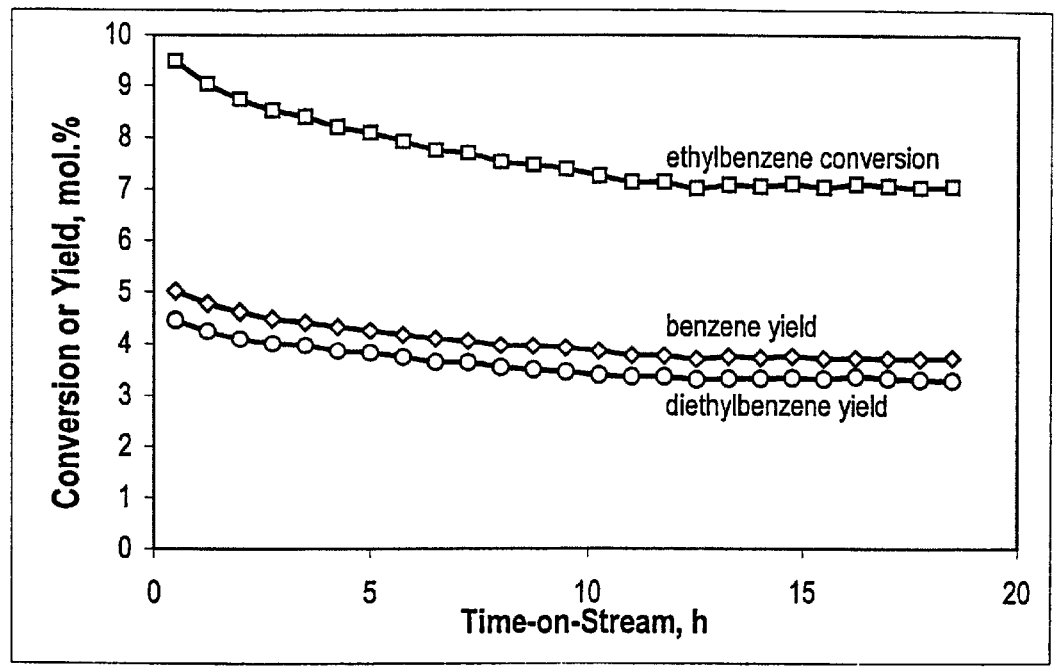
FIG. 1 is a graphical representation of the conversion ethylbenzene and yields of benzene and diethylbenzenes over Al-SSZ-33.

The present invention provides an efficient new method for preparing zeolites having heteroatoms substituted into the zeolite lattice.

The invention is based on the unexpected discovery that aluminosilicate/gallosilicate/ferrosilicate zeolites, particularly large and extra-large pore zeolites can be prepared by using their borosilicate counterparts as starting materials. The method includes, but is not limited to, using the borosilicate counterparts of the following zeolites as a starting material: SSZ-24, SSZ-31, SSZ-33, SSZ-41, SSZ-42, SSZ-43, SSZ-45, SSZ-47, SSZ-48, CIT-1, CIT-5 and UTD-1. U.S. Pat. Nos. 4,834,958/4,936,977 (SSZ-24), 5,106,801 (SSZ-31), 4,963,337 (SSZ-33), 5,653,956/5,770,175 (SSZ-42), 5,965,104 (SSZ-43), 6,033,643 (SSZ-45), 5,512,267 (CIT-1), 6,040,258 (CIT-5) and 5,489,424 (UTD-1), and pending applications U.S. Ser. Nos. 08/992,054 (SSZ-47) 08/992,520 (SSZ-48), 09/520,640 (SSZ-55), teaching the synthesis of SSZ-24, SSZ-31, SSZ-33, SSZ-41, SSZ-42, SSZ-43, SSZ-45, SSZ-47, SSZ-48, SSZ-55, CIT-1, CIT-5 and UTD-1, respectively, which are incorporated herein by reference in their entireties.

In one embodiment, the invention provides a method for making large or extra-large pore alumino-, gallo- and ferrosilicate zeolites according to the invention. The method includes contacting a calcined large or extra-large pore borosilicate zeolite with an acid (e.g., 0.01 N aqueous HCl solution), thereby producing an at least partially deboronated zeolite. The at least partially deboronated zeolite is then contacted with a solution selected from the group consisting of an aqueous aluminum salt solution, thereby producing an aluminosilicate zeolite; an aqueous gallium salt solution, thereby producing a gallosilicate zeolite; an aqueous iron salt solution, thereby producing a ferrosilicate zeolite; and mixtures thereof. The solubilized aluminum salt preferably includes aqueous $Al(NO_3)_3$ and/or $Al_2(SO_4)_3$ solution. The solubilized gallium salt preferably includes $Ga(NO_3)_3$ and/or $Ga_2(SO_4)_3$. The solubilized iron salt preferably includes $Fe_2(NO_3)_3$ and/or $Fe_2(SO_4)_3$.

The contacting in the second step occurs at a pH of not greater than about 3.5. Both contacting steps occur at a temperature of from about ambient temperature to about 300° C. Pressure is from about 0 to about 1000 psig, preferably ambient. Both contacting steps optionally occur under stirring or tumbling.

Preferably, in the second contacting step, when the solution consists of an aqueous solution of aluminum salt or gallium salt or iron salt or mixture thereof, the weight ratio of the at least partially deboronated zeolite to the corresponding salt(s) is from about 1:1 to about 1:100, and the water content is from about 50 weight percent to about 99.5 weight percent of the solution.

A second embodiment of the invention provides a method for making large or extra-large pore alumino-, gallo- and ferrosilicate zeolites, comprising a step which includes contacting a calcined large or extra-large pore borosilicate zeolite with a solution selected from the group consisting of an aqueous aluminum salt solution, thereby producing an aluminosilicate zeolite; an aqueous gallium salt solution, thereby producing a gallosilicate zeolite; an aqueous iron salt solution, thereby producing a ferrosilicate zeolite; and mixtures thereof; and wherein the contacting occurs at a pH of not greater than about 3.5. This second embodiment combines the two steps of the first embodiment in one step (contacting step). The contacting step occurs at a temperature of from about ambient temperature to about 300° C. The method of the second embodiment is implemented in a manner similar to the manner in which the method of the first embodiment is implemented.

The various embodiments of the invention (methods A, B, and C), are described below using illustrative examples. The examples are only provided as an illustration of the invention and should not limit the scope thereof which is defined by the claims appended below.

| Index for Examples | |
|---|---|
| Example 1. | Synthesis of B-SSZ-33. |
| Example 2. | Preparation of Al-SSZ-33 from B-SSZ-33 via Method A under reflux. |
| Example 3. | Preparation of Al-SSZ-33 from B-SSZ-33 via Method B under reflux. |
| Example 4. | Preparation of Al-SSZ-33 from B-SSZ-33 via Method C under reflux. |
| Example 5. | Physicochemical characterization of Al-SSZ-33 samples prepared from B-SSZ-33 via different post-synthetic treatment methods (Examples 2–4). |
| Example 6. | Ammonia TPD of Al-SSZ-33 samples prepared from B-SSZ-33 via different post-synthetic treatment methods (Examples 2–4). |
| Example 7. | Constraint Index determinatin of Al-SSZ-33 samples prepared from B-SSZ-33 via different post-synthetic treatment methods (Examples 2–4). |
| Example 8. | Ethylbenzene disproportionation on Al-SSZ-33 prepared via Method B (Example 3). |
| Example 9. | Spaciousness Index determinations of Al-SSZ-33 prepared via Method B (Example 3). |
| Example 10–13 | Preparation of Al-SSZ-33 via two-step post-synthetic treatment (Method A) of B-SSZ-33 with various zeolite-to-$Al(NO_3)_3$ ratios. |
| Example 14–17 | Preparation of Al-SSZ-33 via one-step post-synthetic treatment (Method B) of B-SSZ-33 with various zeolite-to-$Al(NO_3)_3$ ratios. |
| Example 18–32 | Preparation of Al-SSZ-33 via one-step post-synthetic treatment of B-SSZ-33 under various conditions. |
| Example 33 | Physicochemical and catalytic characterizatin of Al-SSZ-33 prepared in Examples 18–32 via one-step post-synthetic treatment of B-SSZ-33 under various conditions. |
| Example 34 | Meta-Xylene isomerization on Al-SSZ-33 prepared in Examples 18 and 26. |
| Example 35 | Preparation of Ga-SSZ-33 from B-SSZ-33 using $Ga(NO_3)_3$ via Method B. |
| Example 36–37 | Preparation of Al-ZSM-11 from B-ZSM-11 using $Al(NO_3)_3$ - a counter example. |
| Example 38 | Preparation of template for the synthesis of B-UTD-1. |
| Example 39 | Synthesis of B-UTD-1. |
| Example 40 | Conversion of B-UTD-1 to Al-UTD-1 |
| Example 41 | Constraint Index Determination of Al-UTD-1 |
| Example 42 | Spaciousness Index Determination of Al-UTD-1 |

| Index for Tables | |
|---|---|
| Table 1 | Results from elemental analyses, $^{27}Al$ MAS NMR and pore volume measurements of B-SSZ-33, deboronated SSZ-33 and resulting Al-SSZ-33 (Example 5). |
| Table 2 | Results from temperature-programmed desorption of ammonia for B-SSZ-33, deboronated SSZ-33 and resulting Al-SSZ-33 (Example 6). |
| Table 3 | Results from elemental analyses and pore volume determination for Al-SSZ-33 prepared via Method A under reflux using various ratios of $Al(NO_3)_3$ solution to zeolite (Examples 10–13). |
| Table 4 | Results from elemental analyses and pore volume determination for Al-SSZ-33 prepared via Method B under reflux using various ratios of $Al(NO_3)_3$ solution to zeolite (Examples 14–17). |
| Table 5 | Preparation conditions of Al-SSZ-33 via one-step post-synthetic treatment of B-SSZ-33 under various conditions (Examples 18–32). |
| Table 6 | Elemental analyses and pore volumes of some Al-SSZ-33 prepared in Example 18–32 under various conditions (Example 33). |
| Table 7 | Relative cracking activity (Constraint Index) for some Al-SSZ-33 materials prepared in Examples 18–32 under various conditions (Example 33). |
| Table 8 | Ammonium desorption data for some Al-SSZ-33 materials prepared in Examples 18–32 under various conditions (Example 33). |
| Table 9 | Selected $^{27}Al$ MAS NMR data for some Al-SSZ-33 materials prepared in Examples 18–32 under various conditions (Example 33). |

-continued

Index for Tables

Table 10   Physicochemical and catalytic properties of (1) Al(NO$_3$)$_3$-treated B-ZSM-11, (2) Al-ZSM-11 prepared via direct synthesis and (3) Al-SSZ-33 (Examples 36 and 37).

Index for Figures

FIG. 1   Conversion of ethylbenzene (X$_{EB}$) and yields of benzene (Y$_B$) and diethylbenzenes (Y$_{DEB}$) over Al-SSZ-33 at 250° C. and W/F$_{EB}$ = 6 g h/mol.

Figure 2:
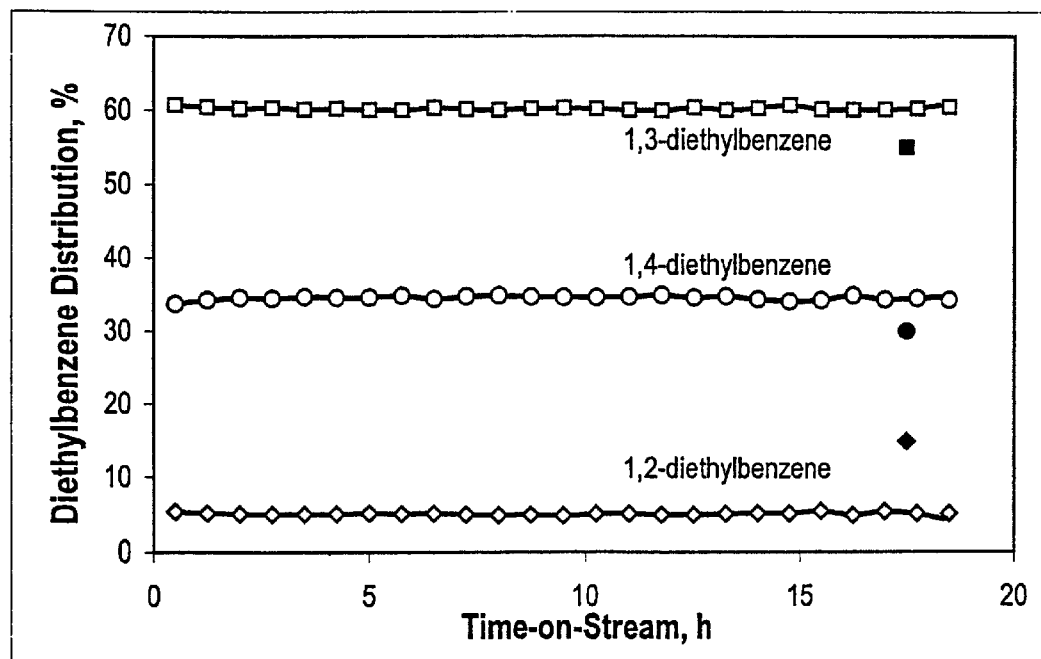
FIG. 2 is a graphical representation of the diethylbenzene isomer distributions over Al-SSZ-33.

FIG. 2   Distributions of the diethylbenzene isomers over Al-SSZ-33 at 250° C. and W/F$_{EB}$ = 6 g h/mol. The full symbols (single points) represent calculated values for the thermodynamic equilibrium at 250° C.

EXAMPLE 1

Synthesis of B-SSZ-33

2.0 Moles of trimethylammonium-8-tricyclo [5.2.1.0] decane in 3700 ml of water are mixed with 3600 ml of water, 92 grams of boric acid and 39 grams of solid NaOH. Once a clear solution is obtained, 558 grams of Cabosil M-5 are blended in and 5 grams of as-made B-SSZ-33 seed material are added. The entire contents have been mixed in the Hastelloy liner used in a 5-gallon autoclave (Autoclave Engineers). The reaction mixture is stirred overnight at 200 rpm and at room temperature. Next, the reactor is ramped up to 160° C. over 12 hours and the stirring rate dropped to 75 rpm. The reaction is held under these conditions for 10 days of run time. The recovered, settled product is crystalline B-SSZ-33 in accord with U.S. Pat. No. 4, 963,337.

A portion of the as-synthesized B-SSZ-33 product prepared above is calcined as follows. The sample is heated in a muffle furnace from room temperature up to 540° C. at a steadily increasing rate over a seven-hour period. The sample is maintained at 540° C. for four more hours and then taken up to 600° C. for additional four hours. The atmosphere is nitrogen at a rate of 20 standard cubic feet per minute with a small amount of air being bled into the flow. The calcined product has the X-ray diffraction pattern lines in accord with U.S. Pat. No. 4,963,337. The elemental analysis of the product gives a molar Si/B ratio of 18.1.

EXAMPLE 2

Preparation of Al-SSZ-33 via Two-step Post-synthetic Treatment of B-SSZ-33—Method A This experiment shows the two steps, the deboronation step and heteroatom substitution step, of the 2-step embodiment (method A) of the method of the invention.

50 Grams of the calcined B-SSZ-33 of Example 1 are first deboronated by stirring in 2000 grams of 0.01 N aqueous HCl solution at room temperature for 24 hours. The resulting deboronated solid is then washed with 2 liters of water, filtered and air-dried at room temperature in vacuum filter.

3 Grams of the above deboronated SSZ-33 are combined with 300 grams of 1 M aqueous Al(NO$_3$)$_3$ solution and treated under reflux for 100 hours. The resulting Al-SSZ-33 product is then washed with 1 liter of water, filtered and air-dried at room temperature in vacuum filter.

EXAMPLE 3

Preparation of Al-SSZ-33 via One-step Post-synthetic Treatment of B-SSZ-33—Method B This experiment shows the combined deboronation/heteroatom substitution of the 1-step embodiment (method B) of the invention. 3 Grams of the calcined B-SSZ-33 of Example 1 are combined with 300 grams of 1 M aqueous Al(NO$_3$)$_3$ solution and treated under reflux for 100 hours. The resulting Al-SSZ-33 product is then washed with 1 liter of water, filtered and air-dried at room temperature in vacuum filter.

EXAMPLE 4

Preparation of Al-SSZ-33 via One-step Post-synthetic Treatment of B-SSZ-33—Method C This experiment shows the combined deboronation/heteroatom substitution of the 1-step embodiment under static conditions (Method C). Method C differs from Method B only in that with Method C the zeolite/Al(NO3)3 slurry is heated in a Teflon-lined autoclove at 100° C. without stirring or tumbling, whereas the combined deboronation/Al-reinsertion with Method B (see Example 3) occurs under dynamic conditions, i.e., under reflux.

With Method C, 3 grams of the calcined B-SSZ-33 of Example 1 are combined with 300 grams of 1 M aqueous Al(NO$_3$)$_3$ solution and heated in a Teflon-lined autoclave under static conditions at 100° C. for 100 hours. The resulting Al-SSZ-33 product is then washed with 1 liter of water, filtered and air-dried at room temperature in vacuum filter.

EXAMPLE 5

Physicochemical Characterization of Al-SSZ-33 Samples Prepared from B-SSZ-33 via Different Post-synthetic Treatment Methods The resulting aluminosilicate products prepared in Examples 2-4 from B-SSZ-33 via the aforesaid three different post-synthetic treatment methods are characterized with various physicochemical methods to be discussed in this example. Some of the results are presented in Table 1.

The powder X-ray diffraction patterns of all the three resulting aluminosilicate products contain peaks characteristic of SSZ-33 in accord with U.S. Pat. No 4,963,337. No other phases are detected. Therefore, these materials prove to be SSZ-33.

The bulk molar Si/Al and Si/B ratios are obtained based on elemental analyses. The framework Si/Al ratios, (Si/Al)$_{framework}$, are determined by $^{27}$Al MAS NMR in combination with elemental analyses. The article in *J. Magn. Res.* 85 (1989), p.173 is a useful reference for the $^{27}$Al MAS NMR measurements. According to $^{11}$B MAS NMR, no boron is detected in all these three Al-SSZ-33 samples. Together with the results from the elemental analyses within the experimental errors, it appears that basically no boron is retained in the deboronated SSZ-33 and the resulting Al-SSZ-33 samples.

The pore volumes are determined based on cyclohexane physisorption at P/P$_o$=0.3 and room temperature. The high adsorption capacities around 0.2 cc/g reveal that there is no pore blocking in the channels of all the starting materials (B-SSZ-33 and deboronated SSZ-33) and resulting Al-SSZ-33 products.

In comparison to Method C, the use of Methods A and B results in the efficient aluminum reinsertion in the framework of SSZ-33, as indicated by the molar Si/Al ratios ($[Si/Al]_{bulk} \approx 13$ and $[Si/Al]_{framework} \approx 16.5$) which are close to the molar Si/B ratio (18.1) of the starting borosilicate SSZ-33. Furthermore, Method B is especially beneficial for making aluminosilicate SSZ-33 since it functions with only one step which starts directly from borosilicate SSZ-33. Of importance is that the same values are achieved in one step of Method B as two steps in Method A.

TABLE 1

Physocochemical Properties of Al-SSZ-33 Prepared via Different Methods

|  | Example 2 | Example 3 | Example 4 |
|---|---|---|---|
| Starting SSZ-33 | Al-SSZ-33 (Method A) under reflux deboronated SSZ-33 $(Si/B)_{bulk} = 359$ pore volume: 0.1806 ml/g | Al-SSZ-33 (Method B) under reflux B-SSZ-33 $(Si/B)_{bulk} = 18.1$ pore volume: 0.1861 ml/g | Al-SSZ-33 (Method C) under static conditions B-SSZ-33 $(Si/B)_{bulk} = 18.1$ pore volume: 0.1861 ml/g |
| $(Si/Al)_{bulk}$ | 13.1 | 12.9 | 21.4 |
| $(Si/Al)_{framework}$ | 16.6 | 16.3 | 24.3 |
| $(Si/B)_{bulk}$ | 191.9 | >1369 | >1372 |
| Pore Volume, cc/g | 0.2097 | 0.2123 | 0.2166 |

The measurement is conducted under a helium flow of 90 cc/min. The Acid Index is reported as weight percent of ammonia desorbed from the dry sample within a certain temperature range. The temperature, $T_{max}$, corresponding to the maximum ammonia desorption rate is used to describe the strength of the acid sites.

The Al-SSZ-33 materials made via Methods A and B have basically the same numbers of acid sites that are higher than that of the Al-SSZ-33 material made via Method C, which is in good agreement with the Si/Al ratios and indicates again that Methods A and B are more efficient routes for aluminum reinsertion in the framework of SSZ-33. As indicated by $T_{max}$, all these three Al-SSZ-33 materials have similar acid strength.

For comparison, the $NH_4$-form of both B-SSZ-33 and deboronated SSZ-33 are prepared in the same way as for Al-SSZ-33 materials. They are also characterized with ammonia TPD. As expected, the acidity of both B-SSZ-33 and deboronated SSZ-33 is very low (see Table 2). $T_{max}$ is only about 190° C. for B-SSZ-33. No $T_{max}$ is reported in Table 2 for deboronated SSZ-33 because its ammonia desorption profile is very broad and flat.

TABLE 2

Ammonia TPD Results of Al-SSZ-33 Prepared via Different Methods

| Zeolite | Preparation Method | Example # | Si/Al | Acid Index 100–300° C. | Acid Index 300–500° C. | Acid Index 500–700° C. | Acid Index Total | $T_{max}$ ° C. |
|---|---|---|---|---|---|---|---|---|
| Al-SSZ-33 | A | 2 | 13.1 | 0.18 | 1.34 | 0.16 | 1.68 | 380 |
| Al-SSZ-33 | B | 3 | 12.9 | 0.18 | 1.30 | 0.13 | 1.61 | 390 |
| Al-SSZ-33 | C | 4 | 21.4 | 0.09 | 1.09 | 0.16 | 1.36 | 415 |
| B-SSZ-33 | — | 1 | 18.1 (B/Si) | 0.25 | 0.01 | 0.03 | 0.29 | 190 |
| Deboronated SSZ-33 | — | * | 359 (B/Si) | 0.02 | 0.04 | 0.05 | 0.11 | — |

*Used in making Al-SSZ-33 of Example 2.

EXAMPLE 6

Temperature-programmed Desorption of Ammonia for Al-SSZ-33 Samples Prepared from B-SSZ-33 via Different Post-synthetic Treatment Methods The resulting Al-SSZ-33 products prepared in Examples 2-4 from B-SSZ-33 via the aforesaid three different post-synthetic treatment methods are further characterized with temperature-programmed desorption (TPD) of ammonia to investigate the acidity. The results are presented in Table 2.

To make $NH_4$-forms of Al-SSZ-33, all the samples are ion-exchanged under reflux three times with 1M aqueous $NH_4NO_3$ solution, 2 hours and zeolite-to-solution ratio of 1:100 (wt:wt) each time. The resulting $NH_4$/Al-SSZ-33 products are then washed with water, filtered and air-dried at room temperature in vacuum filter.

The ammonia TPD measurements are carried out by using a thermogravimetric analyzer coupled with a mass spectrometric detector. During each ammonia TPD measurement, the $NH_4$/Al-SSZ-33 sample is heated from room temperature to 100° C., kept isothermal at 100° C. for 60 minutes, and then heated to 700° C. at a heating rate of 10° C./min.

EXAMPLE 7

Determination of the Constraint Index of Al-SSZ-33 Samples Prepared from B-SSZ-33 via Different Post-synthetic Treatment Methods The resulting Al-SSZ-33 products prepared in Examples 2–4 from B-SSZ-33 via the aforesaid three different post-synthetic treatment methods are further characterized with the acid-catalyzed cracking of n-hexane and 3-methylpentane for the determination of the Constraint Index. Each Al-SSZ-33, in the hydrogen form, is pelletized, broken and meshed (20–40). About 0.50 gram is loaded into a ⅜ inch stainless steel tube with inert alundum on both sides of the zeolite bed. After in-situ drying to about 800° F., the catalyst is cooled down to 500° F. in a flow of helium. A 50/50 w/w feed of n-hexane and 3-methylpentane is introduced at a WHSV of 0.34 $h^{-1}$ to run a Constraint Index test for the Al-SSZ-33. Feed delivery is made via syringe pump. Direct sampling onto a gas chromatograph is begun after 10 minutes of feed introduction. The Constraint Index values are calculated from gas chromatographic data using methods known in the art.

The feed conversion is. above 99% at 500° F. and 0.34 h$^{-1}$ for all three Al-SSZ-33 materials prepared in this invention for the first sampling, occurring at 10 minutes of reaction. This high feed conversion above 99% at the very low reaction temperature of 500° F. and at the very low WHSV of 0.34 h$^{-1}$ CVS. T >600° F. and WHSV=0.68 h$^{-1}$ used normally for other zeolites indicates that these Al-SSZ-33 materials possess an exceptionally high catalytic activity for acid-catalyzed reactions. By contrast, as disclosed in U.S. Pat. No. 4,963,337, the feed conversion over the starting material B-SSZ-33 and prior art Al-SSZ-33 catalyst at 800° F. and 10 minutes of reaction is ~0% and 62%, respectively, indicating a much lower acidity vs. that of the Al-SSZ-33 products of the present invention. Combining the information obtained from elemental analyses/$^{27}$Al MAS NMR (Example 5), ammonia TPD (Example 6) and catalytic cracking of n-hexane/3-methylpentane (this Example), it is apparent that the two aluminosilicate SSZ-33 materials prepared with Methods A and B possess the most efficient Al-reinsertion and are the most active catalysts among those tested. Therefore, a superior method is taught here for introducing aluminum atoms into zeolite frameworks formerly occupied by boron atoms, and this contrast is also demonstrated with some of our own prior art.

The Constraint Index values for all three Al-SSZ-33 materials amount to ~0.5. This is also consistent with a large pore zeolite, showing no steric preference for cracking the smaller, linear hexane isomer.

EXAMPLE 8

Ethylbenzene Disproportionantion on Al-SSZ-33

The Al-SSZ-33 material prepared in Example 3 from B-SSZ-33 via Method B is further characterized with the acid-catalyzed disproportionation reaction of ethylbenzene. This reaction is used as a test reaction for the rapid discrimination between 12- and 10-MR zeolites (see Weitkamp et al. in Erdöl und Kohle-Erdgas 39, 1986, p. 13). The reaction of the present example is conducted following the experimental procedure described in this reference.

According to Weitkamp et al., an induction period is characteristic of the 12-MR zeolites (e.g., Y and ZSM-12), namely, the ethylbenzene conversion increases with the time-on-stream at the onset of the reaction. It is followed by a stationary or quasi-stationary stage during which the conversion remains constant or decreases slowly. With 10-MR zeolites, there is no induction period and the catalyst deactivation is considerably faster. Pronounced differences are encountered between the distributions of the diethylbenzene isomers formed on 12- and 10-MR zeolites: (1) with 12-MR zeolites, in the quasi-stationary stage the isomer distributions are essentially independent of the time-on-stream and close to the thermodynamic equilibrium; (2) with 10-MR zeolites, the selectivity for 1,2-diethylbenzene is very low and the isomer distributions change significantly with the time-on-stream in favor of the para-selectivity (1,4-diethylbenzene). In addition, the difference between the yields (Y) of benzene and diethylbenzenes is also pronounced although equal molar yields of benzene and diethylbenzenes are expected based on stoichiometry: on 12-MR zeolites, the molar ratio of $Y_{DEB}/Y_B$ typically amounts to 0.9 as compared to 0.75 on 10-MR zeolites.

The time-on-stream behavior of Al-SSZ-33 during ethylbenzene disproportionation is depicted in FIG. 1. No induction period is observed and the deactivation is considerable, implying that SSZ-33 appears to be a 10-MR zeolites. However, the molar $Y_{DEB}/Y_B$ ratio is close to 0.9, which suggests, together with the distributions of the diethylbenzene isomers shown in FIG. 2, that SSZ-33 is a 12-MR zeolite. This less straightforward picture obtained from SSZ-33 is related to the fact that SSZ-33 has an unusual framework structure which contains intersecting 10- and 12-MR channels.

Compared to the zeolites studied by Weitkamp et al. (Erdöl und Kohle-Erdgas 39 1986, p. 13) and Al-SSZ-42 reported by Zones at al. (*Chemistry—A European Journal* 4, 1998, p.1312), this Al-SSZ-33 material exhibits a very high catalytic activity for ethylbenzene disproportionation, as indicated by its very low modified residence time $W/F_{EB}$ of 6 g h/mol (vs. $W/F_{EB}$=49–5100 g h/mol for other zeolites reported in these two references above). Here W stands for the mass of the catalyst dried at 350° C. and $F_{EB}$ for the molar flux of ethylbenzene at the reactor inlet.

EXAMPLE 9

Determination of the Spaciousness Index of Al-SSZ-33

The Al-SSZ-33 material prepared in Example 3 from B-SSZ-33 via Method B is loaded with 0.27 wt.-% Pd and further characterized with bifunctionally catalyzed hydrocracking of n-butylcyclohexane for the determination of the Spaciousness Index (SI). The SI is defined as the yield ratio of iso-butane and n-butane in hydrocracking of a $C_{10}$-cycloalkane such as n-butylcyclohexane over bifunctional zeolites containing both hydrogenation/dehydrogenation function and acidity. The ratio increases with increasing pore size and is proven to be a useful tool for characterizing the shape selective properties of molecular sieve materials. Based on the results of a variation of nature and amount of the noble metal exchanged into the acid zeolites, the use of Pd as hydrogenation/dehydrogenation component is recommended. The optimum Pd loading is around 0.27 wt. %. In addition, experimental data reveal that the Spaciousness Index (SI) is under certain circumstances independent of (i) the reaction temperature, (ii) the Si/Al ratio of zeolite and (iii) the crystal size. Hence, it represents a characteristic constant for a given zeolite. There are several publications on the Spaciousness Index. The two references are given below:

(i) J. Weitkamp, S. Ernst and R. Kumar, *Appl. Catal.* 27, 1986, p.207.

(ii) J. Weitkamp, S. Ernst and C. Y. Chen, in "*Zeolites: Facts, Figures, Future*", p. 1115, Proceedings of the 8th International Zeolite Conference, Amsterdam, The Netherlands, Jul. 10–14, 1989, Studies in Surface Science and Catalysis, Vol. 49, edited by P. A. Jacobs and R. A. van Santen, Publisher: Elsevier, Amsterdam—Oxford—New York—Tokyo, 1989.

For the determination of the Spaciousness Index, Pd/Al-SSZ-33 (0.27 wt. % Pd) is pretreated in hydrogen flow using the following temperature program:

from room temperature to 660° F. at a heating rate of 2° F./minute, at 660° F. for 10 hours, cool down to certain reaction temperature (e.g., 530° F.) to start the determination of the Spaciousness Index.

The reaction is performed at pressure=200 psig and WHSV=3 h$^{-1}$. The reaction temperature is varied between 390 and 570° F. n-Butylcyclohexane is used as feed.

Al-SSZ-33 has a Spaciousness Index of 9.0. In the literature, the following values of the SI are reported for various zeolites: 21.0 (Y), 20.5 (ZSM-20), 19.0 (Beta), 17.0

(L), 15.0 (SSZ-42), 11.5 (UTD-1), 7.5 (mordenite), 5.0 (EU-1 and offretite), 4.0 (SAPO-5), 3.0 (ZSM-12) and 1.0 (ZSM-5/-11/-22-23). According to the above SI values, the effective size of the 10-12 MR intersection Pd/Al-SSZ-33 is smaller than the effective diameter of the largest voids in Y, ZSM-20, beta, L, SSZ-42 and UTD-1 but larger than those of other zeolites containing 12-MR channels such as mordenite, offretite, SAPO-5 and ZSM-12. The SI data are in consistence with the SSZ-33 structure which consists of intersecting 12- and 10-MR channels.

EXAMPLES 10–13

Preparation of Al-SSZ-33 via Two-step Post-synthetic Treatment (Method A) of B-SSZ-33 with Various Ratios of Al(NO$_3$) Solution to Zeolite This series of Al-SSZ-33 materials is prepared with various ratios of Al(NO$_3$)$_3$ solution to B-SSZ-33 via the 2-step method (Method A) of the present invention to demonstrate the relationship between the Al-reinsertion and zeolite-to-Al(NO$_3$)$_3$ ratio. This 2-step method consists of the deboronation step and heteroatom substitution step. The procedure is described in Example 2 where a weight ratio of 100:1 for 1 M aqueous Al(NO$_3$)$_3$ solution to B-SSZ-33 is used. The preparation of the starting B-SSZ-33 and the deboronation of this B-SSZ-33 are described in Examples 1 and 2, respectively.

In each preparation of this series of experiments, 3 grams of the above deboronated SSZ-33 are combined with a certain amount of 1 M Al(NO$_3$)$_3$ solution, varying between 18 and 300 grams, and treated under reflux for 100 hours. The resulting Al-SSZ-33 product is then washed with 1 liter of water, filtered and air-dried at room temperature in vacuum filter.

Table 3 lists the ratios of Al(NO$_3$)$_3$ solution to zeolite used in this series of preparations, the bulk molar Si/Al ratios and pore volumes of the resulting Al-SSZ-33 products.

The powder x-ray diffraction data reveal that all the resulting Al-SSZ-33 materials prepared in this series of experiments have the peaks characteristic of the SSZ-33 structure and no other phases are detected. With all the preparations, no pore plugging is observed, as evidenced by the high pore volumes determined by cyclohexane physisorption. Within the analytical errors of elemental analyses, it's apparent that essentially no boron is left in these Al-SSZ-33 products. With decreasing amount of Al(NO$_3$)$_3$ solution, the Si/Al ratios of the resulting aluminosilicate SSZ-33 materials increase, indicating that less aluminum is reinserted into the SSZ-33 framework. It teaches that for a higher ratio of solution to zeolite, the Al incorporation is more effective. These ratios are higher than what we taught in the prior art.

The Al-SSZ-33 materials listed in Table 3 are further characterized with the acid-catalyzed cracking of n-hexane and 3-methylpentane for the determination of the Constraint Index, as described in Example 7. The feed conversion is above 99% at 500° F. and 0.68 h$^{-1}$ for all these Al-SSZ-33 materials for the first sampling, occurring at 10 minutes of reaction. As discussed in Example 7, this high feed conversion above 99% at the very low reaction temperature of 500° F. indicates that these Al-SSZ-33 materials possess an exceptionally high catalytic activity for acid-catalyzed reactions.

TABLE 3

Al-SSZ-33 Prepared via Method A under Reflux Using Various Ratios of Al(NO$_3$)$_3$ Solution to Zeolite

| Example | Zeolite | Si/Al | Si/B | Pore Volume ml/g | Remarks |
|---|---|---|---|---|---|
| 1 | B-SSZ-33 | — | 18.1 | 0.1861 | starting B-SSZ-33 material |
| a | Deboronated SSZ-33 | — | 359 | 0.1806 | prepared via deboronation of the above B-SSZ-33 |
| 2 | Al-SSZ-33 | 13.1 | 191.9 | 0.2097 | S/Z = 100:1* |
| 10 | Al-SSZ-33 | 17.0 | ∞ | 0.2021 | S/Z = 50:1 |
| 11 | Al-SSZ-33 | 20.1 | ∞ | 0.1995 | S/Z = 25:1 |
| 12 | Al-SSZ-33 | 24.7 | ∞ | 0.1972 | S/Z = 16:1 |
| 13 | Al-SSZ-33 | 22.3 | ∞ | 0.2085 | S/Z = 6:1 with with additional H$_2$O/Z = 12:1$ |

*S/Z stands for the weight ratio of 1 M aqueous Al(NO$_3$)$_3$ solution to deboronated SSZ-33.
$H$_2$O/Z stands for the weight ratio of additional H$_2$O to deboronated SSZ-33. This additional amount of water is added to the 1 M aqueous Al(NO$_3$)$_3$ solution used in this specific preparation of low S/Z ratio in order to get a better slurried reaction medium.
a Deboronated SSZ-33 used in making Al-SSZ-33 of Example 2.

EXAMPLES 14–17

Preparation of Al-SSZ-33 via One-step Post-synthetic Treatment (Method B) of B-SSZ-33 with Various Ratios of Al(NO$_3$)$_3$ Solution to Zeolite This series of Al-SSZ-33 materials is prepared with various ratios of Al(NO$_3$)$_3$ solution to B-SSZ-33 via the 1-step method (Method B) of the present invention to demonstrate the relationship between the Al-reinsertion and zeolite-to-Al(N0$_3$)$_3$ ratio. With this 1-step method, the borosilicate SSZ-33 zeolite is deboronated and the heteroatoms are substituted into the zeolite framework in one single step. The procedure is described in Example 3 where a weight ratio of 100:1 for 1 M aqueous Al(NO$_3$)$_3$ solution to B-SSZ-33 is used. The preparation of the starting B-SSZ-33 is described in Example 1.

In each preparation of this series of experiments, 3 grams of the above B-SSZ-33 are combined with a certain amount of 1 M Al(NO$_3$)$_3$ solution, varying between 18 and 300 grams, and treated under reflux for 100 hours. The resulting Al-SSZ-33 product is then washed with 1 liter of water, filtered and air-dried at room temperature in vacuum filter.

The Al-SSZ-33 materials prepared in this series of experiments via Method B are characterized with the same physicochemical methods as for those prepared via Method A (see Examples 2 and 10–13), namely, powder X-ray diffraction, elemental analyses and cyclohexane adsorption for pore volume determination. Similar to Table 3 dedicated to Al-SSZ-33 materials prepared via Method A, Table 4 lists the ratios of Al(N0$_3$)$_3$ solution to zeolite used in this series of preparations via Method B, the bulk molar Si/Al ratios and pore volumes of the resulting Al-SSZ-33 products. The results are similar to those disclosed in Examples 10–13 (see Table 3).

The powder X-ray diffraction data reveal that all the resulting Al-SSZ-33 materials prepared in this series of experiments have the peaks characteristic of the SSZ-33 structure and no other phases are detected. With all the preparations, no pore plugging is observed, as evidenced by the high pore volumes determined by cyclohexane physisorption. Within the analytical errors of elemental analyses, it's apparent that essentially no boron is left in these Al-SSZ-33 products. With decreasing amount of Al(NO$_3$)$_3$ solution, the Si/Al ratios of the resulting aluminosilicate SSZ-33 materials increase, indicating that less aluminum is reinserted into the SSZ-33 framework. It teaches again that for a higher ratio of solution to zeolite, the Al incorporation is more effective.

The Al-SSZ-33 materials listed in Table 4 are further characterized with the acid-catalyzed cracking of n-hexane and 3-methylpentane for the determination of the Constraint Index, as described in Examples 7 and 10–13. The feed conversion is above 99% at 500° F. and 0.68 h$^{-1}$ for all these Al-SSZ-33 materials for the first sampling, occurring at 10 minutes of reaction. As discussed in Examples 7 and 10–13, this high feed conversion above 99% at the very low reaction temperature of 500° F. indicates that these Al-SSZ-33 materials possess an exceptionally high catalytic activity for acid-catalyzed reactions.

TABLE 4

Al-SSZ-33 Prepared via Method B under Reflux Using Various Ratios of Al(NO$_3$)$_3$ Solution to Zeolite

| Example | Zeolite | Si/Al | Si/B | Pore Volume ml/g | Remarks |
|---|---|---|---|---|---|
| 1 | B-SSZ-33 | — | 18.1 | 0.1861 | starting B-SSZ-33 material |
| 3 | Al-SSZ-33 | 12.9 | >1369 | 0.2123 | S/Z = 100:1* |
| 14 | Al-SSZ-33 | 14.4 | 278.2 | 0.2071 | S/Z = 50:1 |
| 15 | Al-SSZ-33 | 18.2 | 65.5 | 0.2019 | S/Z = 25:1 |
| 16 | Al-SSZ-33 | 19.1 | 237.2 | 0.1982 | S/Z = 16:1 |

TABLE 4-continued

Al-SSZ-33 Prepared via Method B under Reflux Using Various Ratios of Al(NO$_3$)$_3$ Solution to Zeolite

| Example | Zeolite | Si/Al | Si/B | Pore Volume ml/g | Remarks |
|---|---|---|---|---|---|
| 17 | Al-SSZ-33 | 20.1 | 707.6 | 0.2067 | S/Z = 6:1 with additional H$_2$O/Z = 12:1$ |

*S/Z stands for the weight ratio of 1 M aqueous Al(NO$_3$)$_3$ solution to B-SSZ-33.
$H$_2$O/Z stands for the weight ratio of additional H$_2$O to B-SSZ-33. This additional amount of water is added to the 1 M aqueous Al(NO$_3$)$_3$ solution used in this specific preparation of low S/Z ratio in order to get a better slurried reaction medium.

EXAMPLES 18–32

Preparation of Al-SSZ-33 via One-step Post-synthetic Treatment of B-SSZ-33 Under Various Conditions This series of Al-SSZ-33 materials is prepared via the 1-step method of the present invention under various conditions. The conditions varied include (1) ratio of 1 M Al(NO$_3$)$_3$ solution to B-SSZ-33, (2) ratio of additional water to B-SSZ-33, (3) pH value of the zeolite/Al(NO$_3$)$_3$ slurry (pH extraneously raised by adding ammonium acetate in Examples 30–32), (4) temperature, (5) length of treatment under fixed conditions, and (6) whether the reaction is stirred or not (Method B or C as described in Example 3 or 4, respectively). The starting material is the B-SSZ-33 prepared in Example 1 with a molar Si/B ratio of 18.1. The experimental conditions are summarized in Table 5.

TABLE 5

Preparation Conditions of Al-SSZ-33 via One-Step Post-Synthetic Treatment of B-SSZ-33 under Various Conditions

| Example # | Amount of B-SSZ-33 g | Amount of 1M Al(NO$_3$)$_3$ solution g | S/Z | Additional H$_2$O/Z | NH$_4$Ac/Z | Final pH | Temp. ° C. | Treatment Time h | Rotation Speed rpm |
|---|---|---|---|---|---|---|---|---|---|
| 18 | 1 | 3 (+2.5 g H$_2$O + | 3:1 | 18:1 | — | 1.60 | 90 | 20 | 0 |
| 19 | 1 | 12 | 12:1 | — | — | — | 100 | 100 | 100 |
| 20 | 1 | 25 | 25:1 | — | — | — | 100 | 100 | 100 |
| 21 | 1 | 50 | 50:1 | — | — | — | 100 | 100 | 100 |
| 22 | 1 | 100 | 100:1 | — | — | — | 100 | 100 | 100 |
| 23 | 100 | 2500 | 25:1 | — | — | 0.63 | 90 | 5 | 200 |
| 24 | 100 | 2500 | 25:1 | — | — | 0.47 | 90 | 21 | 200 |
| 25 | 100 | 2500 | 25:1 | — | — | 0.47 | 90 | 28 | 200 |
| 26 | 100 | 2500 | 25:1 | — | — | 0.43 | 90 | 45 | 200 |
| 27 | 1.50 | 5 (+2.5 g H$_2$O) | 3.33:1 | 1.67:1 | — | 0.66 | 140 | 72 | 0 |
| 28 | 1.50 | 5 (+10 g H$_2$O) | 3.33:1 | 6.67:1 | — | 1.05 | 140 | 72 | 0 |
| 29 | 1.50 | 5 (+25 g H$_2$O) | 3.33:1 | 16.67:1 | — | 1.15 | 140 | 72 | 0 |
| 30 | 1.50 | 5 (+2.5 g H$_2$O + 0.9 g NH$_4$Ac) | 3.33:1 | 1.67:1 | 0.6:1 | 3.04 | 140 | 48 | 0 |
| 31 | 1.50 | 5 (+10 g H$_2$O + 0.9 g NH$_4$Ac) | 3.33:1 | 6.67:1 | 0.6:1 | 3.34 | 140 | 48 | 0 |
| 32 | 1.50 | 5 (+25 g H$_2$O + 0.9 g NH$_4$Ac) | 3.33:1 | 16.67:1 | 0.6:1 | 4.10 | 140 | 48 | 0 |

(1) S/Z stands for the weight ratio of 1 M aqueous Al(NO$_3$)$_3$ solution to B-SSZ-33.
(2) H$_2$O/Z stands for the weight ratio of additional H$_2$O to B-SSZ-33. This additional amount of water is added to the 1 M aqueous Al(NO$_3$)$_3$ solution used in these specific preparations of low S/Z ratios in order to get better slurried reaction mediums and to adjust the pH.
(3) NH$_4$Ac/Z stands for the weight ratio of additional ammonium acetate to B-SSZ-33. The addition of ammonium acetate to the aqueous Al(NO$_3$)$_3$ solution used in these specific preparations is intended to further adjust the pH values of the reaction mediums.

EXAMPLE 33

Physicochemical and Catalytic Characterization of Al-SSZ-33 Prepared in Examples 18–32 via One-step Post-synthetic Treatment of B-SSZ-33 Under Various Conditions The Al-SSZ-33 materials prepared in Examples 18–32 via one-step post-synthetic treatment of B-SSZ-33 under various conditions are characterized with the following techniques:

(1) powder X-ray diffraction,
(2) elemental analyses,
(3) nitrogen adsorption at 196° C. for micropore volume determination,
(4) temperature-programmed desorption (TPD) of ammonium,
(5) $^{27}$Al MAS NMR,
(6) acid-catalyzed cracking of n-hexane/3-methylpentane for the Constraint Index determination.

The powder X-ray diffraction data indicate that the aluminosilicate products prepared in this series of experiments exhibit the peaks characteristic of SSZ-33 crystal structure.

Table 6 gives results from some elemental analyses and micropore volume determination for some of the treatments disclosed in Examples 18–32. It can be seen that several treatments produce Al-SSZ-33 products with a molar Si/Al ratio ranging from 13–18 and having completely fully-measurable micropore volumes. Some treatments produce low Si/Al values of 5.5 and 7.5 (Examples 31 and 32, respectively) but we show later that these are flawed catalysts, having much non-framework Al-species (the pH becomes too high and the Al salt solubility too low).

TABLE 6

Elemental Analyses and MicroPore Volumes of Some Al-SSZ-33 Prepared in Example 18–32 under Various Conditions

| Example # | Zeolite | Si/Al | Si/B | Micropore Volume, ml/g |
|---|---|---|---|---|
| 1 | B-SSZ-33 | — | 18.1 | 0.21 |
| 18 | Al-SSZ-33 | 18 | — | 0.20 |
| 20 | Al-SSZ-33 | 18 | 33 | 0.20 |
| 21 | Al-SSZ-33 | 15 | 140 | 0.21 |
| 22 | Al-SSZ-33 | 13 | >500 | 0.21 |
| 24 | Al-SSZ-33 | 22 | 350 | — |
| 25 | Al-SSZ-33 | 22 | 350 | — |
| 26 | Al-SSZ-33 | 24 | 300 | — |
| 30 | Al-SSZ-33 | 33.5 | — | — |
| 31 | Al-SSZ-33 | 5.5 | — | — |
| 32 | Al-SSZ-33 | 7.5 | — | — |

Table 7 compares the catalytic activity for a number of Al-SSZ-33 samples in the Constraint Index cracking test with our value from our original work (prior art teaching in U.S. Pat. No. 4,963,337). This test reaction is described in detail in Example 7. It is apparent that a conversion of 62% at 800° F. from our prior art teaching (U.S. Pat. No. 4,963,337) is far less active than ~100% conversion at 250–300° F. lower temperatures as seen for Examples 18, 23, 24 and 26. Two samples prepared at pH above ~3.5 (Examples 31 and 32) have the highest Al amounts (Table 6) and are considerably less active than most of the other Al-SSZ-33 materials. The low activity of these two materials comes from the fact that the Al salt solubility becomes lower at higher pH, enhancing the precipitation of Al-species and declining the efficiency of Al-incorporation.

TABLE 7

Relative Cracking Activity (Constraint Index) for Some Al-SSZ-33 Materials Prepared in Examples 18–32

| Example # | Temperature, ° F. | Conversion at 10 Minutes |
|---|---|---|
| U.S. Pat. 4,963,337 | 800 | 62% |
| 18 | 550 | 97% |
| 23 | 500 | 100% |
| 23 | 500 | 76% at 40 min. |
| 24 | 500 | 100% |
| 24 | 500 | 84% at 40 min. |
| 26 | 500 | 100% |
| 26 | 500 | 90% at 40 min. |
| 31 | 600 | 63% |
| 32 | 600 | 74% |

Table 8 shows 2 cases (for Al-SSZ-33 prepared in Examples 18 and 22) where the ammonia desorption peak shifts into the 330–500° C. range. As discussed in Table 2(Example 6), it is at $T_{max}$=~190° C. for B-SSZ-33. The shift to higher temperature is consistent with the zeolite having stronger acid sites, which is what happens when Al substitutes for B in the lattice. The details about the ammonia TPD experiments are described in Example 6. The $NH_3$ desorbs and is detected by mass spectroscopy after $NH_4^+$ cations have been ion-exchanged onto the zeolite. The Acid Index is reported here as the weight percent of ammonia desorbed from the dry sample within a certain temperature range, e.g., 300–500° C.

TABLE 8

Ammonium Desorption Data for Some Al-SSZ-33 Materials Prepared in Examples 18–32

| Example # | Zeolite | Acid Index in 300–500° C. Range |
|---|---|---|
| 1 | B-SSZ-33 | None (peak is at ~190° C.) |
| 18 | Al-SSZ-33 | 0.79 |
| 22 | Al-SSZ-33 | 0.90 |

Table 9 shows the NMR detection of mostly framework Al sites (tetrahedral sites) in the samples treated as compared with Al which didn't completely incorporate into the framework (octahedral sites). One can see that treatment in Example 22 incorporates more tetrahedral Al into the framework sites than in Example 18.

TABLE 9

Selected $^{27}$Al MAS NMR Data for Some Al-SSZ-33 Materials Prepared in Examples 18–32

| Example # | Tetrahedral Al % | Octahedral Al % | Bulk Molar Si/Ne | Molar (Si/Al) framework |
|---|---|---|---|---|
| 18 | 88 | 12 | 18 | 20.5 |
| 22 | 79 | 21 | 13 | 16.5 |

Based on the results reported above, several facts have been learned over the course of the studies:
(1) A high concentration of aluminum nitrate under stirring/tumbling conditions gives the most active zeolite catalyst (see Table 6, Example 22).
(2) For this reaction, the effect is not instantaneous; 21 hours (Example 24) of treatment is better than just 5 hours (Example 23) although a great deal of the benefit is already realized at this point (see Table 7 for the relative cracking activity results).
(3) It is possible to exceed the boron lattice substitution in the resulting aluminum contents but not all the Al is in the framework sites according to NMR where octahedral Al is not in framework (see Table 9).

(4) The highest amount of Al (Table 6, Examples 31 and 32) comes from raising the treatment pH above ~3.5. However, these materials are considerably less active than most of the other treated materials as can be seen by the Constraint Index data in Table 7. The lower activity of these two materials comes from the fact that the Al salt solubility becomes lower at higher pH, enhancing the precipitation of Al-species and declining the efficiency of Al-incorporation.

(5) As demonstrated with Examples 2 and 10–13, we also found we could hydrolyze boron out with an acid such as aqueous HCl solution and then reinsert Al in a subsequent step (Method A). There is no catalytic benefit in using this 2-step approach. However, this 2-step method is particularly useful to convert borosilicate zeolites such as B-UTD-1 to aluminosilicate zeolites such as Al-UTD-1 which are synthesized using organo-metallic compounds as structure-directing agents (see Examples 38–42).

(6) The pore volumes are largely unaffected by this 2-step approach (see Tables 1, 3, 4 and 6), thereby not diminishing the potential catalytic activity.

EXAMPLE 34

Meta-Xylene Isomerization on Al-SSZ-33 Prepared in Examples 18 and 26

Catalytic testing is carried out on Al-SSZ-33 for the isomerization of meta-xylene. Catalytic testing is carried out in a downflow, fixed bed reactor operating at ambient pressure and controlled to 317° C. in the center catalyst zone. Catalyst chips of 35–70 mesh are used. The catalysts are initially heated to 350° C. in helium (50 ml/min. STP). Over a 20-minute period, the temperature is reduced to 317° C. and the helium stream is then swept through a saturator containing 3.4 Torr vapor of meta-xylene (10° C.) adsorbed on Chromosorb 102 (a Supelco product). Inlet and outlet lines were kept at 120° C. to prevent condensation. The modified residence time $W/F_{m\text{-}xylene}$ is varied between 3 and 65 g h/mol in order to keep the conversions of meta-xylene in the range of 10–12%. For this targeted feed conversion, the catalyst activity is inversely proportional to $W/F_{m\text{-}xylene}$. Here W stands for the mass of the catalyst dried at 350° C. and $F_{m\text{-}xylene}$ for the molar flux of meta-xylene at the reactor inlet.

It is found that the Al-SSZ-33 catalyst from Example 26 above has about double the activity as the material made in Example 18, more or less in accord with previous practice.

EXAMPLE 35

Preparation of Ga-SSZ-33 from B-SSZ-33 using Ga(NO$_3$)$_3$ via Method B

A gallosilicate SSZ-33 material is prepared from B-SSZ-33 via the 1-step method (Method B) described in Example 3 as follows: 3 grams of the B-SSZ-33 prepared in Example 1 are combined with 300 grams of 1 M aqueous Ga(NO3)3 solution and treated under reflux for 100 hours. The resulting Ga-SSZ-33 product is then washed with 1 liter of water, filtered and air-dried at room temperature in vacuum filter.

The powder X-ray diffraction data indicate that the resulting Ga-SSZ-33 product has the peaks characteristic of the SSZ-33 crystal structure. This Ga-SSZ-33 material is also characterized with the acid-catalyzed cracking of n-hexane and 3-methylpentane. This test reaction is described in detail in Examples 7 and 33. The feed conversion is ~55% at 600° F. and 0.68 h$^{-1}$ WHSV over this Ga-SSZ-33 material for the first sampling, occurring at 10 minutes of reaction. By contrast, the same feed conversion was reached at 800° F. under otherwise identical conditions over the Ga-SSZ-33 sample from our original work (prior art teaching in Example 10 of U.S. Pat. No. 4,963,337). It is apparent that the Ga-SSZ-33 material prepared in the present invention possesses a higher catalytic activity for acid catalyzed reaction than that from our prior art teaching (U.S. Pat. No. 4,963,337). Therefore, a superior method is taught here for introducing gallium atoms into zeolite frameworks formerly occupied by boron atoms, and this contrast is also demonstrated with some of our own prior art.

EXAMPLES 36 and 37

Preparation of Al-ZSM-11 from B-ZSM-11 using Al(NO$_3$)3 —A Counter Example—

This experiment gives some comparative data for Al-reinsertion counter examples involving ZSM-11 which is a 10-MR zeolite. Here we compare ZSM-11 (10-MR) to SSZ-33 (12/10-MR) for Al-reinsertion.

The starting material B-ZSM-11 is synthesized as described in U.S. Pat. No. 5,645,812 to Nakagawa. Each of the calcined B-ZSM-11 and calcined B-SSZ-33 are subjected to the same aluminum nitrate treatment via the 1-step treatment (Method B, see Example 3): 25 ml of 1 M Al(NO$_3$)$_3$ solution are added to 1 gram of borosilicate zeolite and heated at 100° C. under stirring (100 rpm) for 100 hours. Both the resulting products are then washed with 1 liter of water, filtered and air-dried at room temperature in vacuum filter. They are subsequently re-calcined as described in Example 1 and characterized with the following four techniques: (1) powder X-ray diffraction, (2) elemental analyses, (3) micropore volume via N$_2$ adsorption at 196° C., and (4) catalytic cracking of n-hexane/3-methylpentane for the Constraint Index (CI) determination.

The powder X-ray diffraction data indicate that the resulting products have the peaks characteristic of the crystal structures of SSZ-33 and ZSM-11, respectively. The results from the elemental analyses, N$_2$ adsorption and Constraint Index testing are given in Table 10. The data shows that the B-ZSM-11 takes up very little Al and the Al(NO$_3$)$_3$-treated B-ZSM-11 is catalytically inactive compared with Al-ZSM-11 which is prepared in direct synthesis. As evidenced by the micropore volume, this inactivity of the Al(NO$_3$)$_3$-treated B-ZSM-11 is NOT due to any pore plugging. Aluminum is just not getting into the pores of 10-MR zeolites. By contrast, as also demonstrated with other example of the present invention, SSZ-33 (which is a 12/10-MR zeolite with its 12-MR channels facilitating the Al-reinsertion) shows all the expected trends for a large pore zeolite.

TABLE 10

Physicochemical and Catalytic Properties of (1) Al(NO$_3$)$_3$-Treated B-ZSM-11, (2) Al-ZSM-11 Prepared via Direct Synthesis and (3) Al-SSZ-33

| Example # | 37 | — | 38 | — |
|---|---|---|---|---|
| Zeolite | B-ZSM-11 Treated with Al(NO$_3$)$_3$ | Al-ZSM-11 from Direct Synthesis (as Reference) | Al-SSZ-33 | Al-SSZ-33 Reported in Other Examples (as Reference) |
| Si, wt. % | 42.5 | | 37.6 | |

TABLE 10-continued

Physicochemical and Catalytic Properties of (1) Al(NO₃)₃-Treated B-ZSM-11, (2) Al-ZSM-11 Prepared via Direct Synthesis and (3) Al-SSZ-33

| Example # | 37 | — | 38 | — |
|---|---|---|---|---|
| Al, wt. % | 0.07 | | 1.74 | |
| B, wt. % | 0.091 | | <0.001 | |
| Conversion CI at 10 Minutes | 0% (600° F.) | >80% (600° F.) | 85% (500° F.) | >80% (500° F.) |
| Micropore Volume, ml/g | 0.17 | 0.17 | 0.20 | 0.20 |

EXAMPLE 38

PREPARATION OF TEMPLATE FOR THE SYNTHESIS OF B-UTD-1

Five grams of decamethyl cobaltecium hexafluorophosphate are dissolved in a warmed solution of 1200 cc ethanol and 800 cc water. This solution is then run through a column of Dowex 50-X8 cation exchange resin (previously washed with 60% ethanol) with the complex sticking to the resin. Next a 50/50 solution of 2 N HCl and ethanol (total=4,500 cc) is run over the exchange resin in a column in order to elute the cobalt complex as a chloride salt. The ethanol portion is stripped off under reduced pressure and at 70° C. The remaining acidic solution is neutralized with concentrated NaOH. This solution is concentrated down to 800 cc under reduced pressure and heating. A threefold extraction is carried out with chloroform using 400 cc each time. Twenty grams of anhydrous MgSO₄ are used to dry the combined extracts and the solution is stripped to dryness to yield the chloride salt.

The recovered chloride salt is then dissolved in 10 cc water and mixed with 20 cc of BioRad AG-1X8 hydroxide exchange resin. The resulting mixture is stirred overnight, after which the resin is filtered off. The resin is then washed with a little additional water and a yellow-brown solution is collected which titrates to 0.25 Molar in hydroxide. Additional product is monitored as coming off resin as long as the yellow color is observed in the elution collection. The color can be used as a measure of extent of ion-exchange in either of the two exchange steps described.

EXAMPLE 39

Synthesis of Borosilicate UTD-1

The synthesis of borosilicate UTD-1 is carried out by combining the following amounts of reagents in a Teflon liner for a Parr 125 cc reactor, and heating for 5 days without stirring at 150° C. Twenty grams of a 0.21 M solution of the cobaltecium hydroxide template of Example 38 are mixed with 3.7 cc of 1.0 N NaOH. Lastly, 2.20 grams of calcined boron beta zeolite are added to supply both the boron and silicon to the reaction. The product crystallizes as clusters of very small rods, and the XRD pattern is considerably line-broadened compared to the pure silica version of UTD-1. The crystallite size is estimated by TEM methods to be about 500–1000 Å A along the C axis. The recovered, settled product (which still contains the template) is analyzed by X-ray diffraction and is crystalline B-UTD-1 in accord with U.S. Pat. No. 5,489,424, issued Feb. 6, 1996 to Balkus et al.

The as-synthesized B-UTD-1 is calcined to remove the organic material in the pores. The material is calcined at 60° C. increase per hour up to 120° C. where it is held for 2 hours. The atmosphere is nitrogen at a rate of 20 standard cubic feet per minute with a small amount of air being bled into the flow. Heating is continued at 60° C. per hour up to 540° C. and the heating is held at this temperature for 4 hours. The calcination is then taken to 600° C. over 2 hours and held at this temperature for another 4 hours before the sample is cooled. The mass loss is typically 12–15% and a gray-green solid is obtained. The X-ray diffraction pattern of the calcined B-UTD-1 is in accord with U.S. Pat. No. 5,489,424, issued Feb. 6, 1996 to Balkus et al.

EXAMPLE 40

Conversion of B-UTD-1 to Al-UTD-1

The task of both removing cobalt and converting the high-silica borosilicate UTD-1 to its more strongly acidic aluminosilicate form is accomplished in two sequential steps (Method A described in Example 2). First, the calcined B-UTD-1 product of Example 39 is refluxed in an 2 N aqueous HCl solution for 1–2 days, yielding a pink solution as cobalt is dissolved. At this stage both the cobalt species occluded in the channels and the boron atoms located in the zeolite framework are removed. The solid is recovered, briefly washed, and then reheated to 140° C. in the presence of aluminum nitrate solution. The proportions to form the solution are 1:1.1:10 for zeolite : Al(NO₃)₃9H₃O : water by weight. The heating is carried out in a Teflon lined reactor for 3 days. At this stage the aluminosilicate UTD-1 has lost no crystallinity, as evidenced by the powder X-ray diffraction pattern. The resulting Al-UTD-1 has an X-ray diffraction pattern in accord with U.S. Pat. No. 5,489,424, issued Feb. 6, 1996 to Balkus et al. This is also true of a sample analyzed just after reflux in 2 N HCl solution. Based on elemental analyses, the resulting Al-UTD-1 has a molar Si/Al ratio of 44. The more active aluminosilicate UTD-1 (Al-UTD-1) is now ready for use in catalytic reactions (see Examples 41 and 42 next).

EXAMPLE 41

Constraint Index Determination of Al-UTD-1

The Al-UTD-1 product prepared in Example 40, in the hydrogen form and calcined in air for about four hours at about 540° C., is further characterized with the acid-catalyzed cracking of n-hexane and 3-methylpentane for the determination of the Constraint Index (CI). Al-UTD-1 is pelletized, broken and meshed (20-40). About 0.50 gram was loaded into a ⅜ inch stainless steel tube with alundum on both sides of the zeolite bed. The experimental conditions and procedure are described in Example 7. The reaction is carried out at 700° F.

The feed conversion is 50% for the first sampling, occurring at 10 minutes of reaction. The catalyst shows gradual fouling with the conversion dropping to 30% after several hours. However, the CI value remains constant over this period, measuring at 0.2. This is also consistent with an extra-large pore zeolite, showing no steric preference for cracking the smaller, linear hexane isomer.

EXAMPLE 42

Spaciousness Index Determination of Al-UTD-1

The Al-UTD-1 material prepared in Example 40 from B-UTD-1 is loaded with 0.27 wt.-% Pd and further characterized with bifunctionally catalyzed hydrocracking of n-butylcyclohexane for the determination of the Spaciousness Index (SI). Details about the Spaciousness Index and procedure of its determination are described in Example 9.

The Pd/Al-UTD-1 has a Spaciousness Index of 11.5, where the yield of hydrocracking products ranges between 15 and 65 %. In the literature, the following values of the SI are reported for various zeolites: 21.0 (Y), 20.5 (ZSM-20), 19.0 (Beta), 17.0 (L), 15.0 (SSZ-42), 9.0 (SSZ-33), 7.5 (mordenite), 5.0 (EU-1 and offretite), 4.0 (SAPO-5), 3.0 (ZSM-12) and 1.0 (ZSM-5/-11/-22/-23). According to the above SI values, the effective pore size of the Pd/Al-UTD-1 is smaller than the effective diameter of the largest voids in Y, ZSM-20, beta, L and SSZ-42 but larger than those of other one-dimensional 12-membered ring zeolites.

While the invention has been described in detail with reference to specific embodiments thereof, it will be apparent to those skilled in the art that various change and modifications can be made, and equivalents employed, without departing from the scope of the claims which follow.

What is claimed is:

1. A method for preparing a large pore or extra large pore zeolite having lattice substituted heteroatoms comprising:
   (a) contacting a calcined borosilicate zeolite with an acid, thereby producing an at least partially deborated zeolite; and
   (b) contacting the at least partially deboronated zeolite with a salt-containing aqueous solution comprising one or more salts selected from the group consisting of aluminum salt, gallium salt, and iron salt, thereby producing a silicate zeolite having a lattice comprising aluminum atoms, gallium atoms, iron atoms or a combination thereof;
      wherein step (b) is conducted at a pH of about 3.5 or less, the salt-containing aqueous solution comprises aluminum salt, gallium salt, iron salt or mixture thereof in a weight ratio of the partially deboronated zeolite to the salt of from about 1:1 to about 1:100, and the salt-containing aqueous solution has a water content of from about 50 weight percent to about 99.5 weight percent.

2. The method of claim 1, wherein the calcined borosilicate zeolite has a pore size larger than approximately 6.5 Å.

3. The method of claim 1, wherein step (a), step (b) or both are conducted at a temperature of from about ambient temperature to about 300° C.

4. The method of claim 1, wherein step (a), step (b) or both are conducted at a pressure of from about 0 psig to about 1000 psig.

5. The method of claim 1, wherein step (a), step (b) or both are conducted under stirring or tumbling.

6. The method of claim 1, wherein the aluminum salt comprises aluminum nitrate.

7. The method of claim 1, wherein the aluminum salt comprises aluminum sulfate.

8. The method of claim 1, wherein the gallium salt comprises gallium nitrate.

9. The method of claim 1, wherein the gallium salt comprises gallium sulfate.

10. The method of claim 1, wherein the iron salt comprises iron nitrate.

11. The method of claim 1, wherein the iron salt comprises iron sulfate.

12. The method of claim 1, wherein the zeolite produced in step (b) comprises an aluminosilicate zeolite selected from the group consisting of SSZ-24, SSZ-31, SSZ-33, SSZ-41, SSZ-42, SSZ-43, SSZ-45, SSZ-47, SSZ-48, SSZ-55, CIT-1, CIT-5, UTD-1, and mixtures thereof.

13. The method of claim 1, wherein the zeolite produced in step (b) comprises a gallosilicate zeolite selected from the group consisting of SSZ-24, SSZ-31, SSZ-33, SSZ-41, SSZ-42, SSZ-43, SSZ-45, SSZ-47, SSZ-48, SSZ-55, CIT-1, CIT-5, UTD-1, and mixtures thereof.

14. The method of claim 1, wherein the zeolite produced in step (b) comprises a ferrosilicate zeolite selected from the group consisting of SSZ-24, SSZ-31, SSZ-33, SSZ-41, SSZ-42, SSZ-43, SSZ-45, SSZ-47, SSZ-48, SSZ-55, CIT-1, CIT-5 UTD-1, and mixtures thereof.

15. A method for preparing a large pore or extra large pore zeolite having substituted heteroatoms, wherein the method comprises contacting a calcined borosilicate zeolite with a solution selected from the group consisting of an aqueous aluminum salt solution, thereby producing an aluminosilicate zeolite; an aqueous gallium salt solution, thereby producing a gallosilicate zeolite; an aqueous iron salt solution thereby producing a ferrosilicate zeolite; and an aqueous solution comprising a mixture of aluminum, gallium and iron salts, thereby producing a zeolite having a lattice comprising a combination of aluminum, gallium and iron; and wherein the contacting occurs at a pH of not greater than 3.5, the salt-containing aqueous solution comprises aluminum salt, gallium salt, iron salt or mixture thereof in a weight ratio of the partially deboronated zeolite to the salt of from about 1:1 to about 1:100, and the salt-containing aqueous solution has a water content of from about 50 weight percent to about 99.5 weight percent.

16. The method of claim 15, wherein the calcined borosilicate zeolite has a pore size larger than approximately 6.5 Å.

17. The method of claim 15, wherein the contacting is conducted at a temperature of from about ambient temperature to about 300° C.

18. The method of claim 15, wherein the contacting is conducted at a pressure of from about 0 psig to about 1000 psig.

19. The method of claim 15, wherein the contacting is conducted under stirring or tumbling.

20. The method of claim 15, wherein the aluminum salt comprises aluminum nitrate.

21. The method of claim 15, wherein the aluminum salt comprises aluminum sulfate.

22. The method of claim 15, wherein the gallium salt comprises gallium nitrate.

23. The method of claim 15, wherein the gallium salt comprises gallium sulfate.

24. The method of claim 15, wherein the iron salt comprises iron nitrate.

25. The method of claim 15, wherein the iron salt comprises iron sulfate.

26. The method of claim 15, wherein the aluminosilicate zeolite comprises a zeolite selected from the group consisting of SSZ-24, SSZ-31, SSZ-33, SSZ-41, SSZ-42, SSZ-43, SSZ-45, SSZ-47, SSZ-48, SSZ-55, CIT-1, CIT-5, UTD-1, and mixtures thereof.

27. The method of claim 15, wherein the gallosilicate zeolite comprises a zeolite selected from the group consisting of SSZ-24, SSZ-31, SSZ-33, SSZ-41, SSZ-42, SSZ-43, SSZ-45, SSZ-47, SSZ48, SSZ-55, CIT-1, CIT-5, UTD-1, and mixtures thereof.

28. The method of claim 15, wherein the ferrosilicate zeolite comprises a zeolite selected from the group consisting of SSZ-24, SSZ-31, SSZ-33, SSZ-41, SSZ-42, SSZ-43, SSZ-45, SSZ-47, SSZ48, SSZ-55, CIT-1, CIT-5, UTD-1, and mixtures thereof.

* * * * *

UNITED STATES PATENT AND TRADEMARK OFFICE
CERTIFICATE OF CORRECTION

PATENT NO. : 6,468,501 B1
DATED : October 22, 2002
INVENTOR(S) : Miller et al.

It is certified that error appears in the above-identified patent and that said Letters Patent is hereby corrected as shown below:

<u>Title page,</u>
Item [73], Assignee, replace "ChevronTexaco Corporation, San Ramon, CA (US)" with -- Chevron U.S.A. Inc., San Ramon, CA (US) --.

Signed and Sealed this

Ninth Day of November, 2004

JON W. DUDAS
*Director of the United States Patent and Trademark Office*